United States Patent
Naveh et al.

(10) Patent No.: US 7,350,087 B2
(45) Date of Patent: Mar. 25, 2008

(54) SYSTEM AND METHOD OF MESSAGE-BASED POWER MANAGEMENT

(75) Inventors: Alon Naveh, Ramat Hasharon (IL);
Mohan Kumar, Aloha, OR (US);
Michael Gutman, Zichron-Yaacov (IL);
Andrew Martwick, Folsom, CA (US);
Gary Solomon, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 10/402,252

(22) Filed: Mar. 31, 2003

(65) Prior Publication Data

US 2004/0210778 A1   Oct. 21, 2004

(51) Int. Cl.
*G06F 1/00* (2006.01)
*G06F 1/26* (2006.01)
*G06F 1/32* (2006.01)

(52) U.S. Cl. .................. 713/300; 713/310; 713/320

(58) Field of Classification Search ............... 713/300, 713/310, 320
See application file for complete search history.

(56) References Cited

U.S. PATENT DOCUMENTS

| | | | |
|---|---|---|---|
| 5,493,684 A | | 2/1996 | Gephardt et al. |
| 5,532,945 A | * | 7/1996 | Robinson ................. 713/321 |
| 5,560,022 A | * | 9/1996 | Dunstan et al. ........... 713/300 |
| 5,638,541 A | * | 6/1997 | Sadashivaiah ............ 713/323 |
| 5,752,050 A | * | 5/1998 | Hernandez et al. ....... 713/330 |
| 5,784,628 A | * | 7/1998 | Reneris .................... 713/300 |
| 5,842,027 A | * | 11/1998 | Oprescu et al. ........... 713/300 |
| 5,983,353 A | * | 11/1999 | McHann, Jr. ............. 713/310 |
| 6,105,142 A | * | 8/2000 | Goff et al. ............... 713/324 |
| 6,122,745 A | * | 9/2000 | Wong-Insley ............. 713/300 |
| 6,131,167 A | * | 10/2000 | Cruz ........................ 713/320 |
| 6,446,214 B2 | * | 9/2002 | Chrysanthakopoulos .... 713/310 |
| 6,493,824 B1 | * | 12/2002 | Novoa et al. ............. 713/162 |
| 6,601,178 B1 | * | 7/2003 | Gulick ..................... 713/322 |
| 6,775,784 B1 | | 8/2004 | Park |
| 7,120,807 B2 | | 10/2006 | Lam et al. |
| 2004/0158751 A1 | | 8/2004 | Lam et al. |

FOREIGN PATENT DOCUMENTS

EP    0 676 685 A    11/1995

OTHER PUBLICATIONS

IEEE Standard for a High Performance Serial Bus, Dec. 12, 1995, IEEE, pp. 17-25.*
International Search Report, PCT/US2004/003351, mailed Nov. 8, 2004, 4 pgs.
Taiwan Patent Publication No. 475107, Abstract, 2 pgs.
Taiwan Patent Publication No. 499636, Abstract, 2 pgs.

* cited by examiner

*Primary Examiner*—Thomas Lee
*Assistant Examiner*—Ji H Bae
(74) *Attorney, Agent, or Firm*—Blakely, Sokoloff, Taylor & Zafman LLP

(57) ABSTRACT

Briefly, system and method for message-based power management which may be used, for example, in computer systems and communications networks. Embodiments of the present invention may include, for example, a device connected to a power management controller (PMC); the device and/or the PMC may send, receive, and/or process power management event (PME) messages. Embodiments of the present invention may operate using links in communicative and/or non-communicative modes. Embodiments of the present invention may include a switch, to send/receive, process, create, re-format and/or route one or more PME message on behalf of various devices, for example, a Peripheral Component Interconnect (PCI) device.

69 Claims, 4 Drawing Sheets

SYSTEM AND METHOD OF MESSAGE-BASED POWER MANAGEMENT

BACKGROUND OF THE INVENTION

In computers and other electronic systems and devices, there may be a need to inform a Power Management Controller (PMC) about a Power Management Event (PME) that may require attention. A PME may occur, for example, when a user presses a key on a keyboard or moves a mouse, in order to "wake up" a computer or a monitor from "sleep mode" or power-saving mode. Another example of a PME is receiving an incoming transmission by a modem or a facsimile operating, e.g., in "idle" or "stand-by" mode.

Applications and devices based on PME-related transmissions may be used, for example, in networks, servers, desktop and mobile computers, wireless communications devices, cellular devices, and high-speed interconnects; for example, an Ethernet controller may restore operation of a system from a "sleep mode" upon receipt of a predefined network transmission.

PME signals initiated by multiple Peripheral Component Interconnect (PCI) devices may be merged and routed as a single input to a PMC, for example, by tying together communication wires, e.g., in a "wired-OR" configuration. Power management software may perform a network scan to locate the originating device or devices. However, actual implementations, for example, some operating systems, may fail in performing the scan across multiple devices and/or across multiple data buses. As a result, the PME-related transmissions of each PCI bus are routed separately, resulting in decreased system efficiency, increased pin count and compatibility problems.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
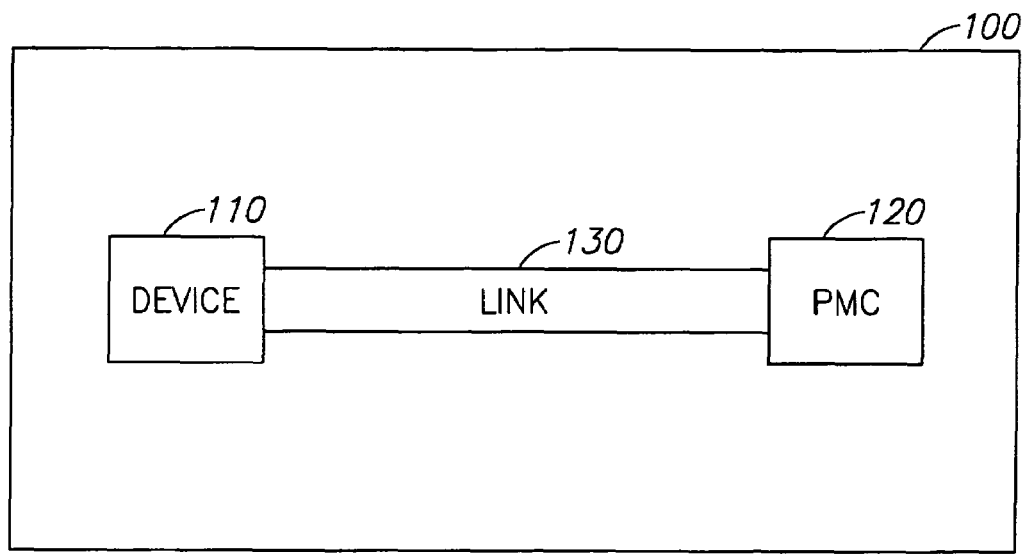
FIG. 1 is a schematic illustration of a communications network incorporating a message-based power management system in accordance with exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the present invention may solve the above problems by providing a mechanism to indicate the source of a Power Management Event (PME) and/or to provide other data regarding a PME. Embodiments of the present invention may achieve these solutions using, e.g., in-band messaging, whereby control messages are communicated via the same channel with the main traffic served by a device, and/or out-of-band messaging, whereby control messages are communicated via a separate, e.g., dedicated, channel. Additionally or alternatively, embodiments of the present invention may bring a network or a link into and out of a non-communicative state. Furthermore, embodiments of the present invention may send, receive and/or process PME messages on behalf of certain devices, for example, Peripheral Component Interconnect (PCI) devices connected to a network.

FIG. 1 is a schematic illustration of a communications network 100 incorporating a message-based power management system in accordance with exemplary embodiments of the present invention. Network 100 may include at least one power-controlled device 110 and at least one Power Management Controller (PMC) 120, connected via a communication link 130.

It will be appreciated that the term "network" as used herein may include any system or sub-system which includes any combination of hardware and/or software components and/or devices and/or systems, for example, a computer, a server, a peripheral device, and the like. Additionally or alternatively, the term "network" may include a wired or wireless Local Area Network (LAN), an Ethernet network, a token ring network, or any other suitable type of communications network.

Network 100 may be implemented, for example, as a system or a sub-system, e.g., a computer, which may include device 110, PMC 120, and link 130, as well as other components, for example, a processor (not shown). Alternatively, in an exemplary embodiment of the present invention, network 100 may be implemented using any suitable type of communications network including device 110, PMC 120, and link 130.

Device 110 may include, for example, a desktop computer, a laptop or notebook computer, a server, a printer, a scanner, a monitor, a copier, a backup tape, or any other suitable device that may be associated with network 100. It is noted that device 110 may include, for example, a standalone unit or a sub-unit of another device or system. Additionally or alternatively, device 110 may include one or more software component.

It will be appreciated that the terms "controller", "power management controller" and/or "PMC" as used herein may include any suitable system, sub-system, unit, device, controller card, processor, and/or any combination of hardware and/or software components.

PMC 120 may include any suitable PMC that may be associated with network 100. It is noted that in embodiments of the present invention, PMC 120 may include, for example, a stand-alone unit or a sub-unit of another device or system. In an exemplary embodiment of the present invention, PMC 120 may be implemented, for example, using a computer server, a processor, a controller card, or one or more sub-unit of a computer system. Additionally or alternatively, PMC 120 may include one or more software component.

Link 130 may include any suitable type of link associated with network 100. Link 130 may include, for example, a wired or wireless connection, and may be active, non-active, communicative or non-communicative, as described in detail herein. Additionally, link 130 may be implemented using any suitable combination of hardware and/or software to establish network communication between components of network 100.

In accordance with embodiments of the invention, a Power Management Event (PME) may include, for example, any event that requires system action, for example, action related to power management. In an exemplary embodiment of the present invention, a PME message may include, for example, a data packet sent and/or received in order to resume operation of a device, for example, device 110, from a low-power "sleep mode".

Upon occurrence of a PME, device 110 may send a data-bearing PME message to PMC 120. Although the present invention is not limited in this regard, the PME message may include data indicating the source of the originating device, for example, the source address of device 110. In an embodiment of the present invention, such data may include, for example, the Internet Protocol (IP) address of device 110. Additionally or alternatively, the PME message may include data by which the originating device may be identified, accessed and/or located, for example, data representing an indication of "Plug-and-Play modem model 123" or "Laser printer connected to bus number 2". Additionally or alternatively, the PME message may include other data indicating the originating device and/or its operation and/or its properties, for example, data representing an indication of "Operating at 56 kilobits per second", or "Operating with Interrupt Request (IRQ) 5".

Additionally or alternatively, in embodiments of the present invention, the data-bearing PME message may include, for example, data indicating a property of the PME that initiated the PME message, and/or data indicating the type of PME that initiated the PME message. This data may be based on a pre-defined list or lookup table of properties and/or types of PME, for example, a PME that requires a device to be brought into "sleep mode", a PME that requires a device to be brought into "active mode", a PME that requires further processing operations by a processor, a PME of type "Incoming facsimile communication", a PME of type "User pressed a key", and the like. Such types may be pre-defined in accordance with specific design requirements, and may include sub-types to allow more detailed classification of the PME.

Additionally or alternatively, in embodiments of the present invention, the data-bearing PME message may include any other suitable data which may be relevant to the PME and/or to operations that need to be performed in conjunction with the PME, in accordance with specific implementations and/or design requirements.

In embodiments of the present invention, PMC 120 may receive the PME message and probe the originating device, e.g., device 110, in accordance with the content of the PME message. Additionally or alternatively, other predefined tasks may be performed; for example, if PMC 120 brings a processor out of "sleep mode", then the processor, which may include hardware and/or software, may probe for the source address of device 110. It is noted that in embodiments of the present invention, device 110 may initiate a PME message on various PMEs, for example, on the arrival of a pre-determined data packet or a pre-determined type of data packet, or on a change in the communication mode of link 130. Device 110 may contain additional information about the PME, and may store information, for example, on a data packet that arrived from network 100 and initiated the PME. In embodiments of the present invention, information about the PME may be included in the PME message, and/or may be stored in a memory associated with device 110 for probing.

Embodiments of the present invention are described herein in the context of two operational modes of link 130, namely, a Communicative Mode (C-mode) and a Non-Communicative Mode (NC-mode). A C-mode may be defined as a mode in which link 130 is either in an active state, e.g., able to transfer data, or capable of being brought into active state. It will be appreciated that in embodiments of the present invention, link 130 maybe switched and/or converted from C-mode to NC-mode, or vice versa, e.g., link 130 may be brought from C-mode to NC-mode, or vice versa.

A NC-mode may be defined as a mode in which the communication channel of link 130 is disabled, e.g., when link 130 is not supplied with power and/or a clock signal that may be essential for communicative operation of link 130. Methods in accordance with embodiments of the present invention may include sending and/or receiving PME messages over link 130, in both the C-mode and the NC-mode, as described in detail below.

Figure 2:
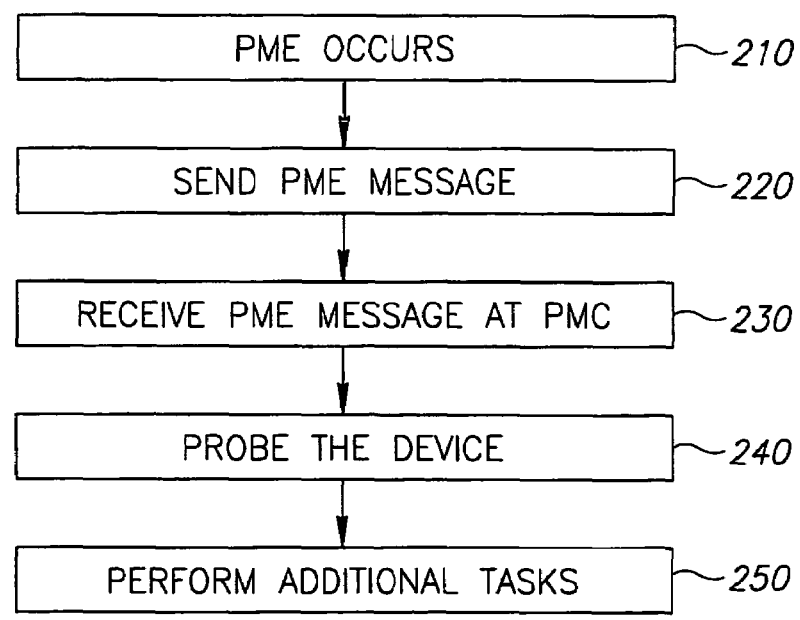
FIG. 2 is a schematic flowchart depicting a message-based power management method in accordance with exemplary embodiments of the present invention, applied to a communicative link of a communications network.

Reference is now made also to FIG. 2, which is a schematic flowchart depicting a message-based power management method in accordance with exemplary embodiments of the present invention, applied to network 100 when link 130 is in C-mode. The method may begin, as indicated at block 210, when a PME occurs, for example, at device 110. A PME message may be sent from device 110, as indicated at block 220, and received by PMC 120, as indicated at block 230. PMC 120 may probe the originating device, e.g., device 110, as indicated at block 240. As described above, such probing may be performed to obtain additional information about the PME, which may be stored in device 110.

Optionally, in embodiments of the present invention, as indicated at block 250, additional tasks may be performed in accordance with the content of the PME message. For example, PMC 120 may "wake up" a processor, which may probe device 110 and obtain data about the PME that the processor needs in order to handle the PME. In an exemplary embodiment of the present invention, if the PME message is an incoming facsimile transmission, then a fax and/or a fax/modem and/or a processor receiving the transmission may be brought out of "sleep mode" and/or may process the transmission. It is noted that using link 130 in C-mode, a PME message may be transferred from device 110 to PMC 120 using the method of FIG. 2 or any other suitable method in accordance with embodiments of the present invention.

Figure 3:
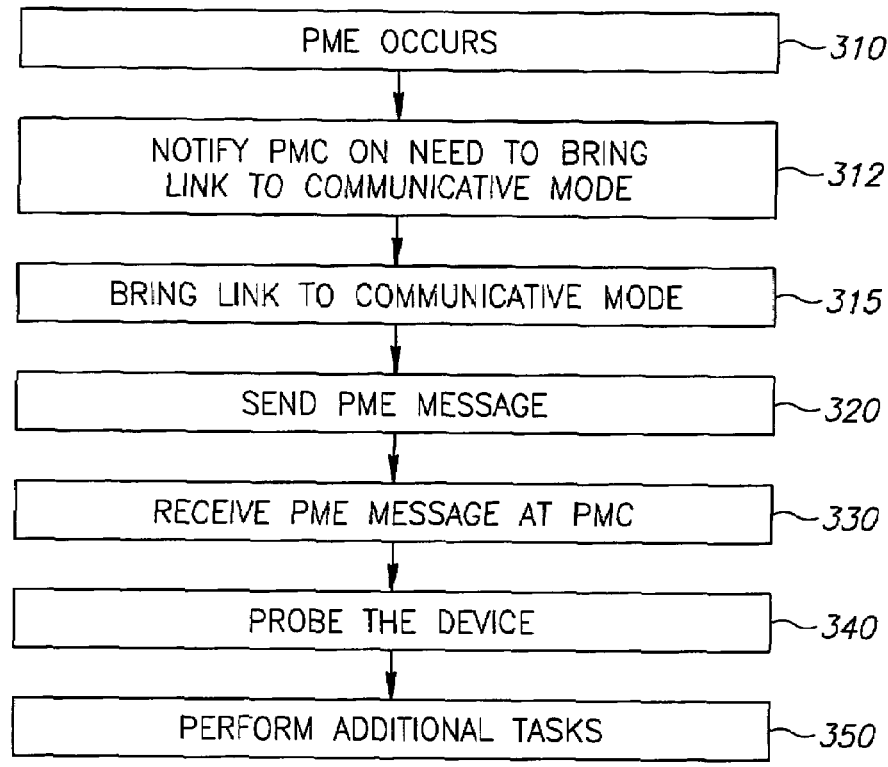
FIG. 3 is a schematic flowchart depicting a message-based power management method, in accordance with exemplary embodiments of the present invention, applied to a non-communicative link of a communications network.

Reference is now made to FIG. 3, which is a schematic flowchart depicting a message-based power management method in accordance with exemplary embodiments of the present invention, applied to network 100 when link 130 is in NC-mode. The method may begin, as indicated at block 310, when a PME occurs, for example, at device 110. As indicated at block 312, device 110 may notify or signal PMC 120 on the need to switch link 130 from NC-mode to C-mode. Such notification or signaling may be out-of-band, i.e., using a predefined signal transferred via a dedicated wire that connects device 110 with PMC 120. Additionally or alternatively, such notification or signaling may be in-band, i.e., through link 130, for example, by transmitting energy through the link in accordance with PCI Express Specification as described in section 4.3.2.4 (Beacon), Revision 1.0, Jul. 22, 2002, and/or using any other suitable transmission protocol.

As indicated at block 315, link 130 may be switched from NC-mode to C-mode. An intervention of PMC 120 may be required in order to switch link 130 from NC-mode to C-mode. Such intervention may include, for example, PMC 120 restoring clock and/or power to link 130.

A PME message may be sent from device 110, as indicated at block 320, and received by PMC 120, as indicated at block 330. PMC 120 may probe the originating device, e.g., device 110, as indicated at block 340, to obtain additional information about the PME stored in device 110. Optionally, as indicated at block 250, additional tasks and/or operations may be performed in accordance with the content of the PME message, for example, the PME message may contain instructions and/or data to allow processing of an incoming transmission. Such additional tasks and/or operations may be performed, for example, by PMC 120, by device 110, by another device or a processor associated with network 100, and/or by any other suitable hardware and/or software component or components. It is noted that using link 130 in NC-mode, a PME message may be transferred from device 110 to PMC 120, for example, after link 130 is switched from NC-mode to C-mode.

In embodiments of the present invention, it may be desired to switch link 130 from C-mode into NC-mode, for example, in order to conserve power during long idle periods. Switching link 130 into NC-mode may include, for example, a "handshake" operation between device 110 and PMC 120, which operation may be performed in accordance with a predefined protocol. Although the present invention is not limited in this regard, the handshake operation may allow device 110 and/or PMC 120 to prepare for NC-mode, for example, to allow device 110 to "arm" its signal-generating circuits or gate internal clocks in preparation for clock removal. Additionally or alternatively, in embodiments of the present invention, the handshake operation may indicate to device 110 and/or PMC 120 that power and/or clock is about to be suspended and/or removed, and/or that sending a PME message may become unreliable, from a certain point in time onward.

Figure 4:
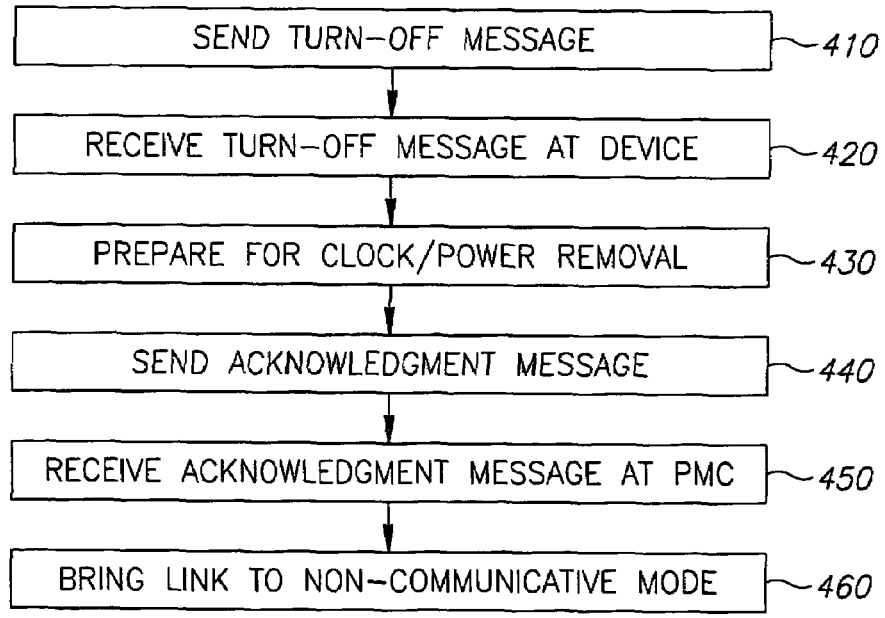
FIG. 4 is a schematic flowchart depicting a handshake operation which may be used by a communications network according to exemplary embodiments of the present invention.

Reference is now made to FIG. 4, which is a schematic flowchart depicting a handshake operation which may be used by network 100 according to exemplary embodiments of the present invention. PMC 120 may send a "turn-off" message to device 110 and/or to all devices connected to PMC 120, as indicated at block 410. Device 110 may receive the "turn-off" message, as indicated at block 420, and may perform suitable preparation tasks before clock and/or power removal, as indicated at block 430. Device 110 may send to PMC 120 an acknowledgment message, as indicated at block 430. It is noted that, in embodiments of the present invention, several acknowledgment messages may be accumulated and/or merged by one or more intermediate unit, and may be routed and/or sent by such one or more intermediate unit to PMC 120, either in their original format or in a modified format. PMC 120 may receive acknowledgment messages from several or all devices connected to PMC 120, as indicated at block 450. Additionally or alternatively, PMC 120 may switch link 130 and/or other links of network 100 into NC-mode, as indicated at block 460.

In embodiments of the present invention, an acknowledgment message sent by device 110 to PMC 120 may also trigger a "flush" operation for earlier PME messages, thereby to push ahead any pending PME messages. It is noted that, in embodiments of the present invention, for example, embodiments that may operate in accordance with PCI ordering rules, an acknowledgment message may be held in queue behind earlier PME messages and, therefore, earlier PME messages may reach PMC 120 prior to power and/or clock removal. In embodiments of the present invention, an acknowledgment message that is generated while one or more PME message are being communicated through network 100 may be held in queue behind earlier PME messages and may not bypass such earlier PME messages.

It is noted that in embodiments of the present invention, link 130 may be switched from NC-mode to C-mode, or vice versa, for example, using in-band messaging and/or out-of-band messaging. The messaging protocol may follow, for example, the PCI Express specification published by PCI Special Interest Group (PCI-SIG) in July 2002, or using any other suitable protocol for changing the mode of operation of link 130.

In embodiments of the present invention, several PME messages may be received by PMC 120 from several devices substantially simultaneously. In such a case, PMC 120 may not be able to store and/or process several concurrent PME messages, and thus PMC 120 may be forced to "drop" or ignore some of the PME messages. To avoid this problem, in embodiments of the present invention, communicating devices, for example, device 110, may periodically re-send a certain PME message to PMC 120, until receiving an acknowledgment message from PMC 120 that the PME message has been received and/or processed.

Figure 7:
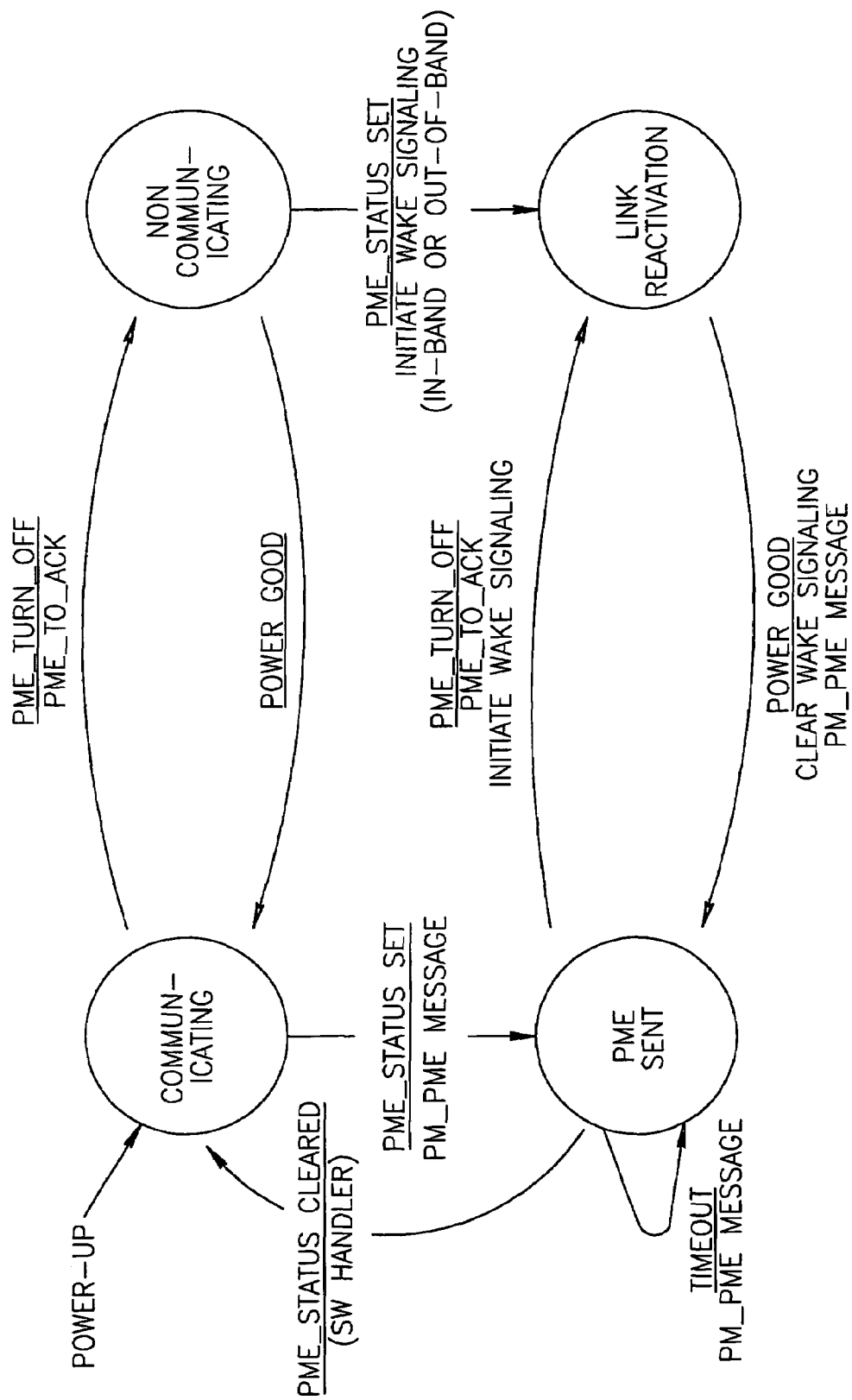
FIG. 7 is a schematic conceptual diagram of various modes of operation of a communications link used in conjunction with a communications network in accordance with exemplary embodiments of the present invention.

Reference is now made to FIG. 7, which schematically illustrates a conceptual diagram of various modes of operation of a communications link, for example, link 130 of FIG. 1, used in conjunction with a communications network in accordance with exemplary embodiments of the invention. It will be appreciated that the conceptual diagram of FIG. 7 is shown for demonstrative purposes only, and that other modes and/or sequences of operation of communication links are also within the scope of embodiments of the invention.

Figure 5:
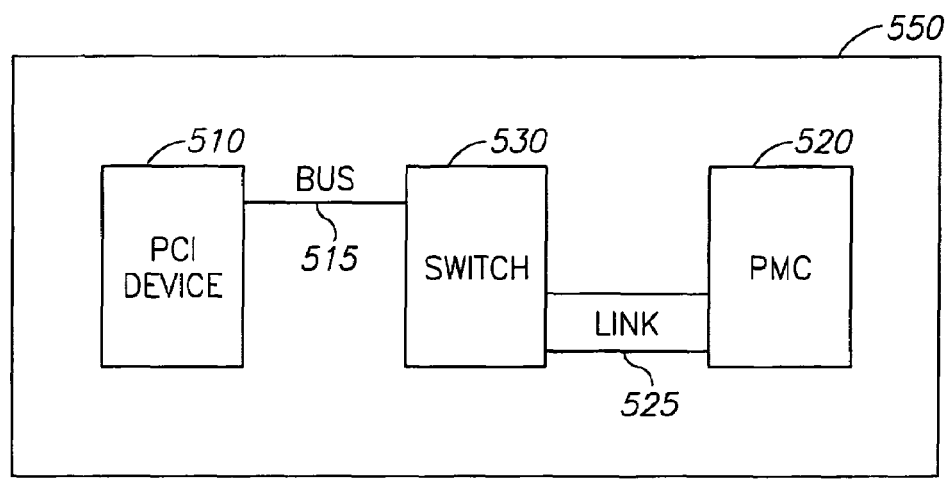
FIG. 5 is a schematic illustration of a communications network incorporating a switch and a message-based power management system in accordance with exemplary embodiments of the present invention.

Reference is now made to FIG. 5, which is a schematic illustration of a communications network 550 incorporating at least one PME message-generating switch 530 and a message-based power management system in accordance with exemplary embodiments of the present invention. Network 550 may include, for example, at least one PCI device 510 and at least one PMC 520. PC device 510 maybe connected to switch 530 by bus 515, and switch 530 maybe connected to PMC 520 by link 525.

PCI device 510 may include, for example, any device which may be connected and/or may operate in accordance with one or more PCI specification. PCI device 510 may initiate a PME by sending a PME signal to PMC 520, however, PCI device 510 may not be able to inform PMC 520 about the origin of the PME. In accordance with embodiments of the present invention, switch 530 may be used to connect PCI device 510 to network 550 and/or to PMC 520, and to send, receive and/or process PME messages on behalf of PCI device 510 and/or on behalf other devices connected to switch 530.

In an embodiment of the present invention, a PME signal may originate from PCI device 510, and may be received by switch 530, for example, using bus 515. Switch 530 may send a PME message to PMC 520 on behalf of PCI device 510. The data contained in the PME message may identify or locate, for example, PCI device 510 and/or bus 515 to which PCI device 510 is connected. Additionally or alternatively, power management software may be used to probe bus 515 which was identified by the PME message sent by switch 530, to identify a property (e.g., an identification code) of the device, for example, PCI device 510, that originated the PME signal.

It will be appreciated by persons skilled in the art that switch 530 may be used to create, construct, format, process, handle, send and/or receive a PME message on behalf of one or more device, or a branch of several devices, which may not be able by themselves to perform such tasks, entirely or in accordance with desired requirements or formats. Additionally or alternatively, in embodiments of the present invention, switch 530 may be used to route, re-create, re-construct and/or re-format a PME message, such as, for example, to convert a PME message into a certain format, protocol or specification. Additionally or alternatively, switch 530 may be used, for example, to merge several PME messages into one PME message or several PME messages, to split and/or copy a PME message into several PME messages, to copy and/or store PME messages for temporary and/or long-term periods of time, or to perform other desired tasks associated with a PME message or with several PME messages. Additionally or alternatively, switch 530 may be used to create and/or convert a a PME messages. Additionally or alternatively, switch 530 may perform the tasks described above while switch 530 is connected between devices that operate in accordance with the same or different protocols or specifications, for example, between a device that operates in accordance with PCI specification and a device that operates in accordance with PCI Express specification.

Figure 6:
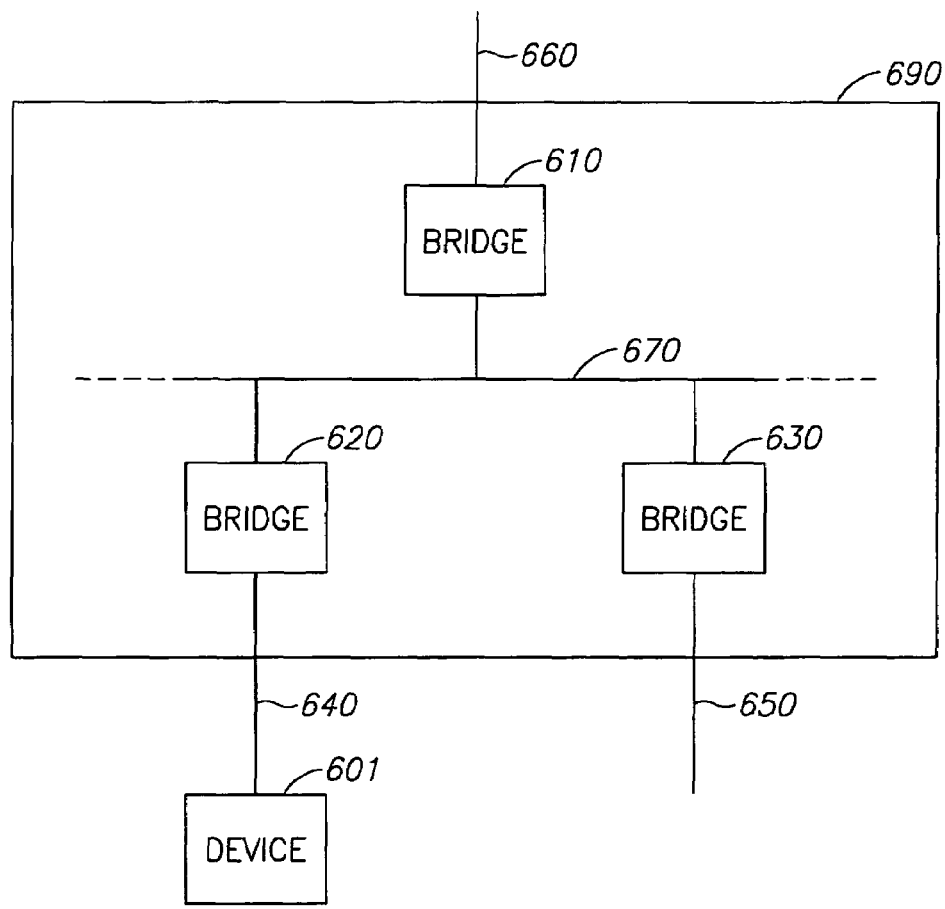
FIG. 6 is a schematic illustration of a switch in accordance with an exemplary embodiment of the present invention, which may be used in conjunction with the communications network of FIG. 5.

Reference is now made also to FIG. 6, which is a schematic illustration of a PME message-generating switch 690 in accordance with an exemplary embodiment of the present invention, which may be used, for example, in conjunction with network 550 of FIG. 5. Switch 690 may include, for example, bus 640, bus 650, bus 660, bus 670, bridge 610, bridge 620, and bridge 630. Switch 690 may receive a PME signal from a PCI device 601 connected to bus 640, and may output a PME message to another device or to a PMC connected to bus 670.

It should be appreciated that the schematic illustration of FIG. 6 is only an exemplary embodiment of a switch in accordance with an aspect of the present invention, and that other implementations of a switch, bridge, controller, hub and/or router are also within the scope of the present invention. Further, it should be appreciated that embodiments of switch 690 may include, for example, memory units, buffers, processors and/or other components (not shown), e.g., to facilitate the operation of specific implementations or to accommodate specific requirements or functionalities.

In an embodiment of the invention, bridge 610, bridge 620 and/or bridge 630 may include, for example, any suitable Point-to-Point (P2P) bridge which may be used for connecting devices, connecting networks, and/or converting data between various formats and/or protocols. Bus 640, bus 650, bus 660 and/or bus 670 may include any suitable internal and/or external data bus, which may be used for connecting devices and/or transferring data, for example, a PCI bus. In an exemplary embodiment of the present invention, bus 640 may be connected to bridge 620, bus 650 may be connected to bridge 630, bus 660 may be connected to bridge 610, and bridges 610, 620 and 630 may be connected to bus 670.

One or more device, for example, PCI device 601, may be connected to bus 640. PCI device 601 may send a PME signal, which may be transferred and/or routed using bus 640 to bridge 620. Bridge 620 may receive the PME signal, and may create a PME message based on the source, e.g., identity, location, or other property of the device originating the PME signal. Specifically, in an exemplary embodiment of the present invention, bridge 620 may construct a PME message which indicates that PCI device 601 is the originating device that sent the PME signal, and/or that a device connected to bus 640 is the originating device that sent the PME signal, and/or includes other data describing the PME and/or PCI device 601 and/or bus 640. Bridge 620 may send the PME message using bus 670.

The PME message may be routed using bus 670, and may reach another device connected to bus 670 (not shown), a PMC connected to bus 670 (not shown), or another bridge, for example, bridge 610, in which case the PME message may be routed upstream. Bridge 610 may transfer the PME message to another device connected to it using bus 660, either in the same format as received by bridge 610 or in another format as modified by bridge 610. It is noted that bridge 620 and/or bridge 610 may, for example, create and/or output a PME message based upon an incoming PME signal, create and/or output a PME message based upon an incoming PME message, re-format and/or re-construct a PME message, or merge several PME signals and/or PME messages into one or more PME message.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, entirely or partly, and may be implemented using specific, multi-purpose or general processors, or devices as are known in the art. Some embodiments may include buffers, registers, storage units and/or memory units, for temporary or long-term storage of data or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

The invention claimed is:

1. An apparatus, comprising:
a controller coupled to a device that originates a data-bearing power management event message, the controller having logic to process the data-bearing power management event message, the message including an identification of the device that originates the data-bearing power management event message which is received over a communication link from the device,
wherein the message is generated by a switch that is different from the device that originates the data-bearing power management event message; and probe logic to obtain additional information regarding the data-bearing power management event message in accordance with a content in the data-bearing power management event message, and then take action based on the additional information regarding the data-bearing power management event message.

2. The apparatus of claim 1, wherein the data-bearing power management event message includes an indication of a property of the device.

3. The apparatus of claim 2, wherein the property includes an address of the device.

4. The apparatus of claim 2, wherein the property includes an identity of the device.

5. The apparatus of claim 1, wherein the data-bearing power management event message includes an indication of a property of a power management event.

6. The apparatus of claim 1, wherein the data-bearing power management event message includes an indication of a type of a power management event.

7. The apparatus of claim 1, wherein the controller comprises logic to send a turn-off message to the device over the communication link.

8. The apparatus of claim 7, wherein the controller comprises logic to receive an acknowledgment message from the device over the communication link.

9. The apparatus of claim 1, wherein the controller comprises logic to perform an operation based on the content in the data-bearing power management event message.

10. The apparatus of claim 1, wherein the controller comprises logic to switch the communication link from a non-communicative mode to a communicative mode.

11. The apparatus of claim 10, wherein the controller comprises logic to restore a clock signal to the communication link.

12. The apparatus of claim 10, wherein the controller comprises logic to restore a communication link power to the communication link.

13. The apparatus of claim 10, wherein the controller comprises logic to receive a notice signal from the device including an indication to switch the communication link.

14. The apparatus of claim 13, wherein the controller comprises logic to receive the notice signal from the device via a dedicated channel.

15. The apparatus of claim 13, wherein the controller comprises logic to receive the notice signal from the device in accordance with a Peripheral Component Interconnect (PCI) Express specification.

16. The apparatus of claim 13, wherein the controller comprises logic to receive the notice signal from the device via a same communication link that routes a main data traffic communicated to the device.

17. The apparatus of claim 13, wherein the controller comprises logic to receive the notice signal from the device by receiving an energy transmitted over the communication link.

18. The apparatus of claim 1, wherein the communication link comprises a same communication link that routes a main data traffic communicated to the switch.

19. A switch comprising:
power management logic to send a data-bearing power management event message that includes an identification of a device that originates the data-bearing power management event message over a communication channel,
wherein the message is generated by the switch, and
wherein the switch is different from the device that originates the data-bearing power management event message; and
probe logic to obtain additional information regarding the data-bearing power management event message in accordance with a content in the data-bearing power management event message, and then take an action based on the additional information regarding the data-bearing power management event message.

20. The switch of claim 19, wherein the data-bearing power management event message includes an indication of a property of the device that originates the data-bearing power management event message.

21. The switch of claim 20, wherein the property comprises at least one property selected from the group consisting of an address of the device that originates the data-bearing power management event message and an identity of the device that originates the data-bearing power management event message.

22. The switch of claim 19, wherein the data-bearing power management event message includes an indication of a property of a power management event.

23. The switch of claim 19, wherein the data-bearing power management event message includes an indication of a type of a power management event.

24. The switch of claim 19, wherein the switch comprises logic to send an acknowledgement message to a controller.

25. The switch of claim 24, wherein the switch comprises logic to send a notice signal to the controller including an indication to switch the communication channel connecting the device and the controller.

26. The switch of claim 25, wherein the switch comprises logic to send the notice signal to the controller via a dedicated channel.

27. The switch of claim 25, wherein the switch comprises logic to send the notice signal to the controller in accordance with a Peripheral Component Interconnect (PCI) Express specification.

28. The switch of claim 25, wherein the switch comprises logic to send the notice signal to the controller via a same communication channel that routes a main data traffic communicated to the device.

29. The switch of claim 25, wherein the switch comprises logic to send the notice signal to the controller by transmitting energy over the communication channel.

30. The switch of claim 19, wherein the device that originates the data-bearing power management event message comprises a modem.

31. The switch of claim 19, wherein the device that originates the data-bearing power management event comprises a printer.

32. The device of claim 19, wherein the communication channel comprises a same communication channel that routes a main data traffic communicated to the switch.

33. A system comprising:
a device that originates a data-bearing power management event message;
a switch that sends the data-bearing power management event message, the message including an identification of the device that originates the data-bearing power management event message over a communication line,
wherein the message is generated by the switch, and
wherein the switch is different from the device that originates the data-bearing power management event message; and a controller having logic to process the power management event message, and also having probe logic to obtain additional information regarding the data-bearing power management event message in accordance with a content in the data-bearing power management event message, and then take an action based on the additional information regarding the data-bearing power management event message.

34. The system of claim 33, wherein the switch further comprises:
logic to determine an identity of the device and to create the data-bearing power management event message.

35. The system of claim 33, wherein the switch further comprises:
logic to receive a signal indicating a power management event and to create the data-bearing power management event message based on the signal.

36. The system of claim 33, wherein the switch further comprises:
logic to convert a first data-bearing power management event message in a first format to a corresponding data-bearing power management event message in a second format.

37. The system of claim 36, wherein the first format is based on a Peripheral Component Interconnect (PCI) specification, and the second format is based on a Peripheral Component Interconnect (PCI) Express specification.

38. The system of claim 33, wherein the communication line comprises a same communication line that routes a main data traffic communicated to the switch.

39. A method comprising:
sending a data-bearing power management event message that includes an identification of a device that originates the power management event message from a switch over a communication connection,
wherein the message is generated by the switch, and
wherein the switch is different from the device that originates the data-bearing power management event message; and
probing to obtain additional information regarding the data-bearing power management event message in accordance with a content in the data-bearing power management event message, and then take an action based on the additional information regarding the data-bearing power management event message.

40. The method of claim 39, wherein sending the data-bearing power management event message comprises sending the data-bearing power management event message including an indication of a property of a source of the data-bearing power management event message.

41. The method of claim 40, wherein the property comprises at least one property selected from the group consisting of an address of a source of the data-bearing power management event message and an identity of a source of the data-bearing power management event message.

42. The method of claim 39, wherein sending the data-bearing power management event message comprises sending the data-bearing power management event message including a type of a power management event.

43. The method of claim 39, further comprising:
receiving a message from a controller; and sending an acknowledgment message from the device.

44. The method of claim 39, further comprising:
sending a notice signal to a controller including an indication to switch the communication connection from a non-communicative mode to a communicative mode, before sending the data-bearing power management event message.

45. The method of claim 44, wherein sending the notice signal comprises sending the notice signal via a dedicated connection.

46. The method of claim 44, wherein sending the notice signal comprises sending the notice signal in accordance with a Peripheral Component Interconnect (PCI) Express specification.

47. The method of claim 44, wherein sending the notice signal comprises sending the notice signal via a same communication connection that routes a main data traffic communicated to the device.

48. The method of claim 44, wherein sending the notice signal comprises transmitting an energy through the communication connection.

49. The method of claim 39, comprising, before sending the data-bearing power management event message, determining an identity of the device and creating the data-bearing power management event message based on the identity.

50. The method of claim 39, comprising, before sending the data-bearing power management event message, receiving a signal indicating a power management event and creating the data-bearing power management event message based on the signal.

51. The method of claim 39, comprising, before sending the data-bearing power management event message, converting a first data-bearing power management event message in a first format to a corresponding data-bearing power management event message in a second format.

52. The method of claim 51, wherein the first format is based on a Peripheral Component Interconnect (PCI) specification, and the second format is based on a Peripheral Component Interconnect (PCI) Express specification.

53. The method of claim 39, wherein the communication connection comprises a same communication connection that routes a main data traffic communicated to the switch.

54. A method comprising:
receiving a data-bearing power management event message that includes a source address of a device that originates the data-bearing power management event message from a switch over a communication bus,
wherein the message is generated by the switch, and
wherein the switch is different from the device that originates the data-bearing power management event message; and
probing to obtain additional information regarding the data-bearing power management event message in accordance with a content in the data-bearing power management event message, and then take an action based on the additional information regarding the data-bearing power management event message.

55. The method of claim 54, further comprising:
processing the data-bearing power management event message.

56. The method of claim 54, further comprising:
sending a turn-off message to the device that originates the data-bearing power management event message.

57. The method of claim 54, further comprising:
performing an operation based on the content of the data-bearing power management event message.

58. The method of claim 54, further comprising:
switching the communication bus between the switch and a controller from a non-communicative mode to a communicative mode before receiving the data-bearing power management event message.

59. The method of claim 58, wherein switching the communication bus comprises restoring a clock signal to the communication bus.

60. The method of claim 58, wherein switching the communication bus comprises restoring a communication bus power to the communication bus.

61. The method of claim 54, wherein the communication bus comprises a same communication bus that routes a main data traffic communicated to the switch.

62. A machine readable storage medium containing instructions, which when executed by a machine cause operations comprising:
  receiving a data-bearing power management event message that includes a source address of a device that originates the data-bearing power management event message from a switch over a communication link,
  wherein the message is generated by the switch, and
  wherein the switch is different from the device that originates the data-bearing power management event message; and
  probing to obtain additional information regarding the data-bearing power management event message in accordance with a content in the data-bearing power management event message and then take an action based on the additional information regarding the data-bearing power management event message.

63. The machine readable storage medium containing instructions of claim 62, wherein the instructions further result in processing the data-bearing power management event message.

64. The machine readable storage medium containing instructions of claim 62, wherein the instructions further result in sending a turn-off message to the device that originates the data-bearing power management event message.

65. The machine readable storage medium containing instructions of claim 62, wherein the instructions further result in performing an operation based on the content of the data-bearing power management event message.

66. The machine readable storage medium containing instructions of claim 62, wherein the instructions result in, before receiving said data-bearing power management event message, switching the communication link between the switch and a controller from a non-communicative mode to a communicative mode.

67. The machine readable storage medium containing instructions of claim 66, wherein the instructions that result in switching the communication link result in restoring a clock signal to the communication link.

68. The machine readable storage medium containing instructions of claim 66, wherein the instructions that result in switching the communication link result in restoring a communication link power to the communication link.

69. The machine readable storage medium containing instructions of claim 62, wherein the communication link comprises a same communication link that routes a main data traffic communicated to the switch.

\* \* \* \* \*